(12) United States Patent
Oizumi et al.

(10) Patent No.: US 7,796,834 B2
(45) Date of Patent: Sep. 14, 2010

(54) POST-PROCESSING TECHNIQUE FOR NOISE REDUCTION OF DCT-BASED COMPRESSED IMAGES

(75) Inventors: Munenori Oizumi, Ibaraki (JP); Naito Tomoyuki, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 972 days.

(21) Appl. No.: 11/560,393

(22) Filed: Nov. 16, 2006

(65) Prior Publication Data

US 2008/0118177 A1    May 22, 2008

(51) Int. Cl.
    *G06K 9/40*  (2006.01)
(52) U.S. Cl. ............... 382/275; 382/266; 382/268; 375/240
(58) Field of Classification Search ............ 382/275
    See application file for complete search history.

(56) References Cited

U.S. PATENT DOCUMENTS

| | | | | |
|---|---|---|---|---|
| 5,392,137 A * | 2/1995 | Okubo | | 358/462 |
| 5,802,218 A * | 9/1998 | Brailean | | 382/275 |
| 5,819,035 A * | 10/1998 | Devaney et al. | | 709/202 |
| 5,929,936 A * | 7/1999 | Arai et al. | | 348/607 |
| 6,201,879 B1 * | 3/2001 | Bender et al. | | 382/100 |
| 6,236,756 B1 * | 5/2001 | Kimura et al. | | 382/239 |
| 6,707,952 B1 * | 3/2004 | Tan et al. | | 382/268 |
| 6,845,180 B2 * | 1/2005 | Matthews | | 382/268 |
| 6,993,191 B2 * | 1/2006 | Petrescu | | 382/205 |
| 7,003,173 B2 * | 2/2006 | Deshpande | | 382/261 |
| 7,003,174 B2 * | 2/2006 | Kryukov et al. | | 382/266 |
| 7,031,552 B2 * | 4/2006 | Kim | | 382/275 |
| 7,038,710 B2 * | 5/2006 | Caviedes | | 348/180 |
| 7,203,234 B1 * | 4/2007 | Zeng | | 375/240.03 |
| 7,346,226 B2 * | 3/2008 | Shyshkin | | 382/275 |
| 7,426,315 B2 * | 9/2008 | Frishman et al. | | 382/268 |
| 2002/0076119 A1 * | 6/2002 | Unruh et al. | | 382/275 |
| 2003/0053708 A1 * | 3/2003 | Kryukov et al. | | 382/261 |

* cited by examiner

*Primary Examiner*—Vu Le
*Assistant Examiner*—Tsung-Yin Tsai
(74) *Attorney, Agent, or Firm*—Robert D. Marshall, Jr.; W. James Brady; Frederick J. Telecky, Jr.

(57) ABSTRACT

A new post-processing methodology reduces the unwanted noise artifacts present in the output images of DCT-based compressed signals. The method determines noise intensity in the region of each pixel of an image and filters each pixel corresponding to this noise intensity. This noise intensity includes ringing intensity and block noise intensity. Determining the noise intensity includes calculating a short range power spectrum and a long range power spectrum. A spectrum is identified as ringing if the short range power spectrum is negative and the long range long range power spectrum is positive. A spectrum is identified as block noise if the short range autocorrelation coefficient is positive and the long range autocorrelation coefficient is positive.

11 Claims, 5 Drawing Sheets

MODEL FOR RINGING

FIG. 2B

MODEL FOR BLOCK NOISE

POST-PROCESSING TECHNIQUE FOR NOISE REDUCTION OF DCT-BASED COMPRESSED IMAGES

TECHNICAL FIELD OF THE INVENTION

The technical field of this invention is video image decoding.

BACKGROUND OF THE INVENTION

Discrete cosine transform (DCT) based data compression techniques, e.g. JPEG and MPEG, are widely used in the field of video/image processing. However, annoying effects resulting from ringing, block noise, and other types of noise occurrences are known to appear in compressed images with low bit rates. Post-processing is often applied to the output images to reduce these artifacts to enhance the image quality. Although these post-processing techniques reduce some noise components, they are often overly complex or inadequate to restore high image quality.

Figure 1:
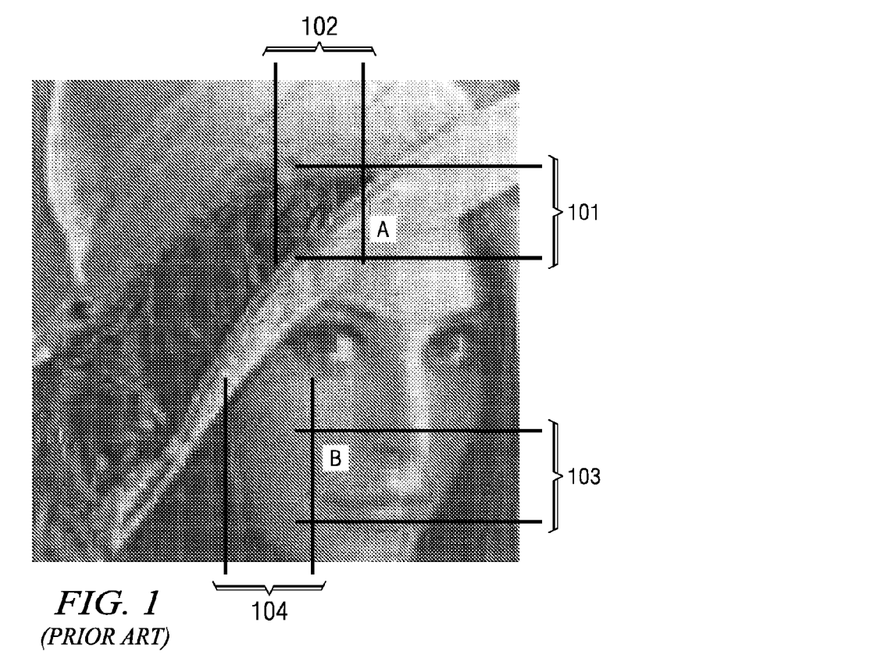
FIG. 1 illustrates a JPEG compressed image with low bit rate of 0.678 bits-per-pixel (Prior Art)

FIG. 1 illustrates a JPEG compressed image with low bit rate of 0.678 bits-per-pixel. The image shows large distortions at various regions. Region A at the intersection of bands 101 and 102 shows a wavy noise near a sharp edge. Region B at the intersection of bands 103 and 104 includes prominent noises near a DCT-block boundary. The noise in region A is called ringing noise. The noise in region B is called block noise. These two noise types show following characteristics. Ringing noise is a wavy noise near a sharp edge. Block noise is a large gap along a DCT block boundary but with no wavy texture in the long range.

Conventional linear filters are commonly used to eliminate high frequency components of decoded image. Since most noise sources have strong contributions in the high frequency spectrum, low pass filtering reduces the noise artifacts. However, low pass filtering removes image detail, which also has high frequency spectrum contributions. The result of low pass filtering is sometimes an unduly dull output image.

Wavelet analysis is employed to reduce the artifacts in DCT-based compressed images. This analysis often produces high quality output images but often requires costly complex computational resources.

SUMMARY OF THE INVENTION

The present invention is a novel post-processing method, which reduces the noise artifacts in the decoded images of DCT-based compressed images. The method applies appropriate filtering to a local area, according to an analysis of local image characteristics using power spectrum analysis. Evaluation of the power spectrum distribution is reduced to computation of auto-correlation coefficients.

The method of post-processing data for noise reduction in a video image decoder determines noise intensity in the region of each pixel of an image, and filters each pixel corresponding to the determined noise intensity. This noise intensity includes ringing intensity and block noise intensity. Determining the noise intensity includes calculating a short range power spectrum and a long range power spectrum. A spectrum is identified as ringing if the short range power spectrum is negative and the long range long range power spectrum is positive. A spectrum is identified as block noise if the short range autocorrelation coefficient is positive and the long range autocorrelation coefficient is positive.

BRIEF DESCRIPTION OF THE DRAWINGS

These and other aspects of this invention are illustrated in the drawings, in which.

DETAILED DESCRIPTION OF PREFERRED EMBODIMENTS

The present invention describes a new method for post-processing to remove unwanted noise from DCT-based images utilizing new models for ringing effects and block noise. The invention develops new models for these effects that are described by a special new processor function derived from the autocorrelation process.

This invention for removal of unwanted noise artifacts from the image signal has the following advantages. First, computational complexity is small compared to conventional filters. The filtering method for each filter is simple compared to other filters such as wavelet filter, despite the high quality of the output images. Second, the invention both detects and removes noise in the image. Image details are preserved and the resulting output is high in quality. The process is applicable to various DCT-based compression techniques such as JPEG and MPEG. The process itself is entirely independent of decoding process, thus, allowing flexibility in designing of the total system.

The most annoying artifacts in DCT-based compressed images are ringing and block noise. Mosquito noise usually coexists with ringing noise and block noises. As a result the new methods to reduce ringing and block noise are also efficient in the reduction of mosquito noise. These two noise types show following characteristics. Ringing noise is a wavy noise near a sharp edge. Block noise is a large gap along a DCT block boundary but with no wavy texture in the long range.

Figure 2A:
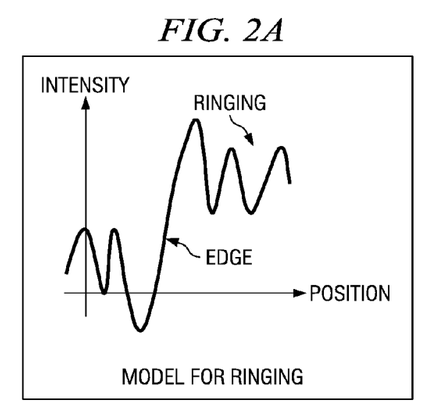
FIG. 2A illustrates the character of the ringing model.
Figure 2B:
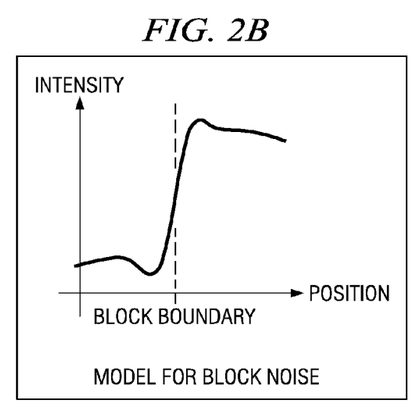
FIG. 2B illustrates the character of the block noise model.

This invention models the two noise types as follows. Ringing noise is modeled as a high frequency component in the short range plus a step-like shape in long range. Block noise is modeled as a step-like shape occurring at the boundary of a scan block plus no high frequency components in the long range. The conceptual images of these models are illustrated in FIGS. 2A and 2B respectively.

The power spectrum in local region surrounding a target pixel can be estimated via a modified autocorrelation coefficient $\rho$ at the grid point nearest the target pixel. The autocorrelation coefficient $\rho$ is negative ($-1 \leq \rho < 0$) if the high frequency element is dominant and $\rho$ is positive ($0 < \rho \leq 1$) if the low frequency element is dominant. Previous research has shown that large positive values of $\rho$ are produced by a step-like function. Based on this new function $\rho$ the ringing and block noise-models are described as follows. Let $\rho_S$ be $\rho$ in the short range and $\rho_L$ be $\rho$ in long range. Then the two types of noise may be distinguished by: ringing noise has negative $\rho_S$ and positive $\rho_L$ near the target pixel; and block noise has positive $\rho_S$ on block boundary and positive $\rho_L$ near the target pixel.

Figure 3:
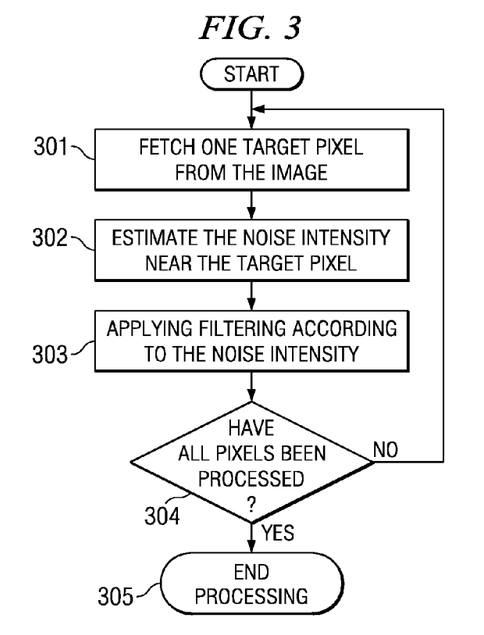
FIG. 3 illustrates the basic process flow of the method for post-processing of DCT-based compressed images using the ringing and block noise models.

FIG. 3 illustrates the basic process flow of the method for post-processing of DCT-based compressed images using the just described ringing and block noise models. The flow diagram includes the following process steps:

Step 301 fetches one target pixel in an image;

Step 302 estimates the noise intensity near the pixel by computation of power spectrum using the autocorrelation function and applying noise intensity metrics according to equation (5) below;

Step 303 applies filtering according to the noise intensity according to equation (7) below;

Step 304 select the next target pixel and repeats 302 through 304 until all pixels are processed; and Step 305 ends processing if step 304 determines all pixels have been processed.

In step 302, the intensities of ringing and block noises are estimated based on the previously described models. In step 303, low pass filtering customized for each target pixel according to equation 7 is applied to the target pixel according to noise intensity calculated for that target pixel. This process is carried out for each pixel in the whole image. Steps 301 through 304 are first applied in the horizontal or the vertical direction and then applied in the other direction.

Consider the task of noise detection. First, it is useful to describe the derivation for intensity of ringing effects. Ringing as illustrated in FIG. 2A displays a wavy appearance near a sharp edge. Let $\rho_S$ be the autocorrelation coefficient in the short range and $\rho_L$ be the autocorrelation coefficient in the long range. In this example short range is the nearest 5 pixels and long range is the nearest 15 pixels in the same line. The ringing model of FIG. 2A is made of high-frequency noise in the short range and a step-like function in the long range. Therefore the mathematical model for ringing extends for values:

$$\rho_S < 0 \text{ and } \rho_L > 0 \tag{1}$$

Ringing intensity $I_{ringing}$ is:

$$I_{ringing} = (\rho_{rth0} - \rho_S) \times (\rho_L - \rho_{rth1}) \tag{2A}$$

for $\rho_S < \rho_{rth0}$ and $\rho_L < \rho_{rth1}$, and $$I_{ringing} = 0 \tag{2B}$$

for all other cases.

For this example: $\rho_{rth0} = 0.2$ and $\rho_{rth1} = -0.5$. The ranges of $\rho_S$ and $\rho_L$ where $I_{ringing} > 0$ are set larger than the ones directly derived from the model to not discard any relevant noise.

As illustrated in FIG. 2B block noise displays a step-like shape at the boundary without accompanying wavelets. The latter condition of equation [2B] avoids mistaking complex texture with block noise. Block noise extends for values:

$$\rho_B > 0 \text{ and } \rho_L > 0 \tag{3}$$

where: $\rho_B$ is the short range autocorrelation coefficient at the block boundary; and $\rho_L$ is the long range autocorrelation coefficient near the target pixel. Block noise intensity $I_{block}$ is:

$$I_{block} = (\rho_B - \rho_{bth0}) \times (\rho_L - \rho_{bth1}) \times b(x) \tag{4A}$$

for $\rho_B > \rho_{bth0}$ and $\rho_L < \rho_{bth1}$, and which grows larger as $\rho_B$ and $\rho_L$ grow larger, and $$I_{block} = 0 \tag{4B}$$

for all other cases.

For this example: $\rho_{bth0} = -1$ and $\rho_{bth1} = -1$. The function $b(x)$ illustrates the impact of block boundary effects. Here x is the distance from the nearest boundary block and $b(x) = 4 - |x|$. This function has been found suitable for 8×8 DCT blocks in JPEG or MPEG images. For other block sizes $b(x)$ should be modified accordingly. Note that the noise intensities $I_{ringing}$ and $I_{block}$ may take other forms of equation which satisfies models of equations (1) and (3).

In step 303 appropriate filtering customized for an individual target pixel is applied to the localized images based on the models and the intensities of ringing and block noise. First, the intensities of ringing noise $I_{ringing}$ and block noise $I_{block}$ for the target pixel are added to show the total noise intensity $I_{total}$ near the pixel, where $$I_{total} = c_{ringing} \times I_{ringing} + c_{block} \times I_{block} \tag{5}$$

where: $c_{ringing}$ and $c_{block}$ are user defined constants, in this example $c_{ringing} = 120/256$ and $c_{block} = 20/256$.

Next, appropriate filtering is applied according to the value of $I_{total}$. In this example a low pass filter is applied to the target pixel. This low pass filter is defined mathematically by the equation:

$$p'_j = \frac{\sum_{k=-2}^{2}(p_{j+k} a_k)}{\sum_{k=-2}^{2}(a_k)} \tag{7}$$

where: $a_k = I_{total} + (1 - |k|)$; $p_i$ is the i-th input pixel; and $p_i'$ is the i-th output pixel in the target line. In equation (7) it is assumed that $I_{total}$ is confined to the interval $0 \leq I_{total} \leq 2$.

The filter described in equation (7) is the transformation of individual input pixels into corresponding individual output pixels for a target line. The transformation generated by the filter is a direct function of the noise intensity metrics computed for the target pixel. Filtering may be supplemented with additional low pass filtering if desired, which narrows the pass-band width as $I_{total}$ increases.

Figure 4:
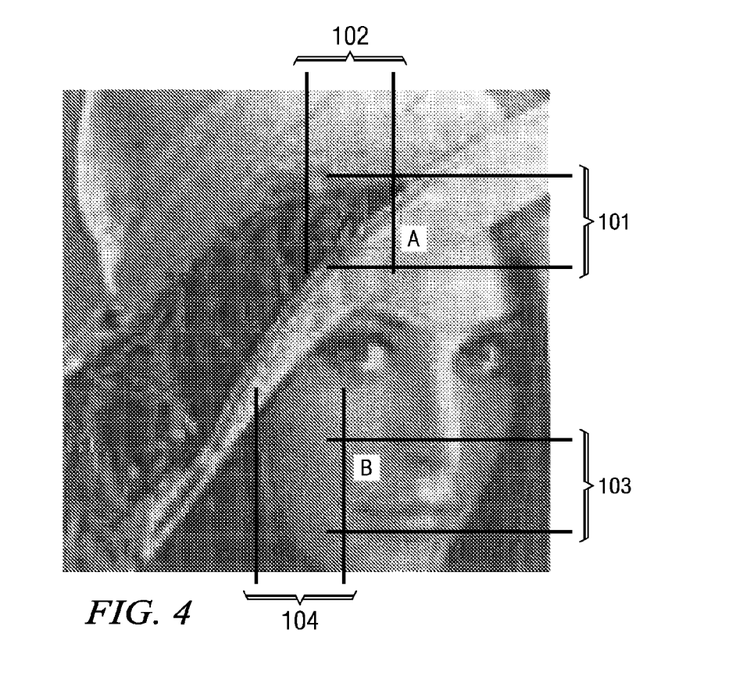
FIG. 4 illustrates a JPEG compressed image of FIG. 1 after completion of post processing according to the present invention.

FIG. 4 illustrates the image obtained from the image data of FIG. 1 after application of the post-processing technique of this invention. This invention greatly reduces noise at regions A, B and other places. On the other hand, this invention preserves overall details. Similar results are obtained for other JPEG images and MPEG video streams.

The major elements of the invention have been concisely in equations (1) through (7). The mathematical background for the derivation of the power spectrum and the metrics to measure the shape of the power spectrum follows. This mathematic derivation also justifies the use of autocorrelation to evaluate the power spectrum distribution.

Figure 5A:
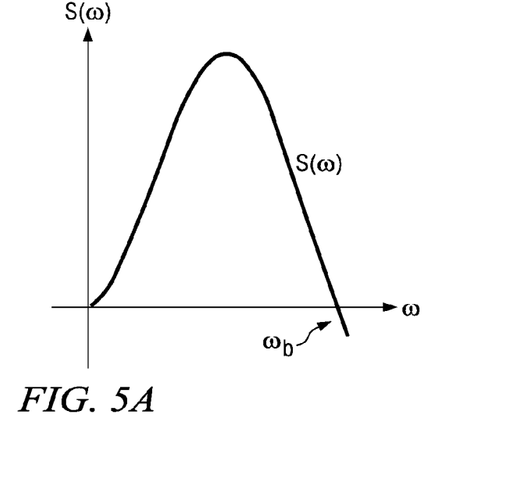
FIG. 5A illustrates noise metrics introduced with the power spectrum.

The frequency distribution of the power spectrum of a typical image $S(\omega)$ is illustrated in FIG. 5A. It is assumed that the spectrum is confined to the frequency range $-\omega_k < \omega < \omega_k$. The spatial average of the original image signal is assumed to be zero. If a DC component exists, it is removed prior to the following calculation.

Figure 5B:
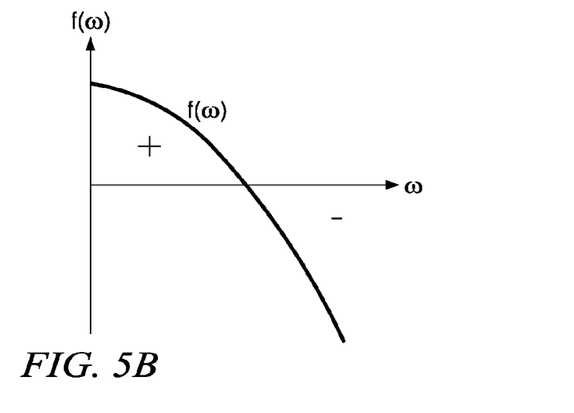
FIG. 5B illustrates an arbitrary function having a positive value near zero and a negative value in the high frequency range.
Figure 5C:
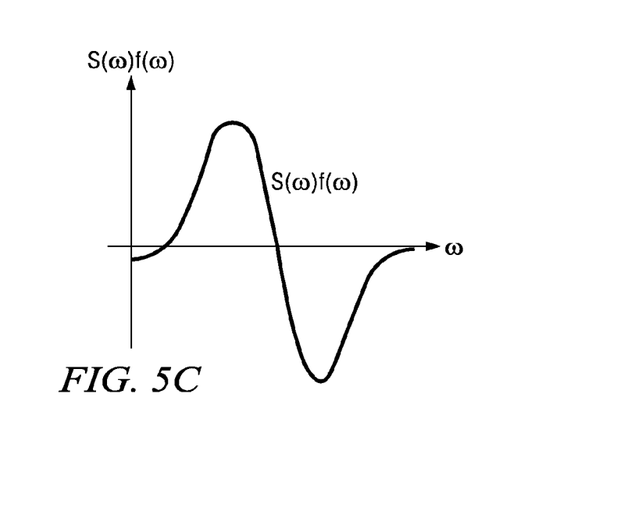
FIG. 5C illustrates a derived power spectrum of the product of the functions of FIGS. 5A and 5B.
Figure 6A:
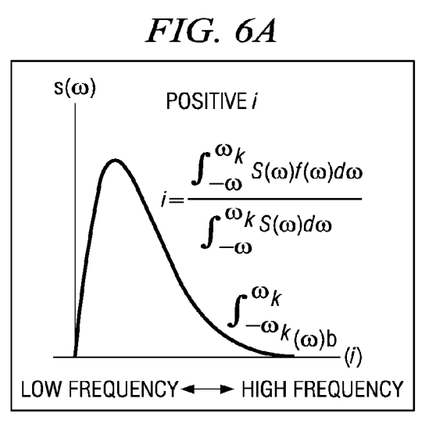
FIG. 6A illustrates the power distribution mainly in low frequency range.
Figure 6B:
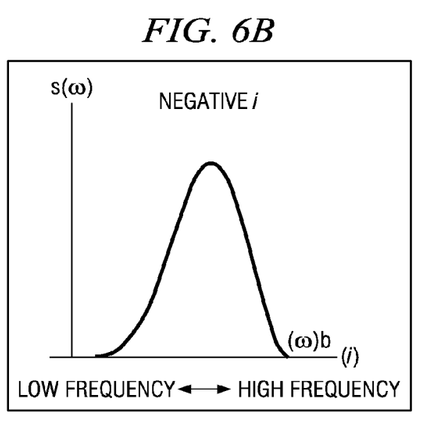
FIG. 6B illustrates the power distribution mainly in high frequency range.

The metric i is used to evaluate the distribution of the spectrum. This metric is given by:

$$i = \frac{\int_{-\omega_k}^{\omega_k} S(\omega) f(\omega) d\omega}{\int_{-\omega_k}^{\omega_k} S(\omega) d\omega} = \frac{I}{I_0} \quad (11)$$

where: $f(\omega)$ is an arbitrary function which is positive value near 0 and negative value near $\omega_k$ as illustrated in FIG. 5B. FIG. 5C illustrates the product of $S(\omega)$ illustrated in FIG. 5A and $f(\omega)$ illustrated in FIG. 5B. If the power spectrum $S(\omega)$ distributes in low frequency region, the combined signal $$\frac{S(\omega_k)}{f(\omega_k)}$$

distributes in the low frequency region with positive value, and the metric i will be positive as illustrated in FIG. 6A. If the power spectrum distributes in high frequency region, the combined signal $S(\omega)f(\omega)$ distributes in the high frequency region as well with a negative number and the metric i will be negative as illustrated in FIG. 6B. In short, distribution of $S(\omega)$ in low frequencies yields a positive i and distribution of $S(\omega)$ in high frequencies yields a negative i.

We have:

$$I = \int_{-\omega_k}^{\omega_k} S(\omega)(\omega_b^2 - \omega^2) d\omega \quad (12)$$
$$= \omega_b^2 \int_{-\omega_k}^{\omega_k} S(\omega) d\omega - \int_{-\omega_k}^{\omega_k} \omega^2 S(\omega) d\omega$$

where: $\omega_b$ is the intersection point of the function $S(\omega)$ with the $\omega$-axis illustrated in FIG. 5A.

Let the auto-correlation function $R_{xx}(\tau)$ be:

$$R_{xx}(\tau) = \frac{1}{T} \int_{-\frac{T}{2}}^{\frac{T}{2}} x(t) x(t+\tau) dt \quad (13)$$

This auto-correlation function $R_{xx}(\tau)$ is also a Fourier transform of the power spectrum, thus can be written as:

$$R_{xx}(\tau) = \frac{1}{2\pi} \int_{-\omega_b}^{\omega_b} S(\omega) e^{-i\omega\tau} d\omega \quad (14)$$

The derivative of the auto-correlation function $R_{xx}(\tau)$ is $$\frac{d^2 R_{xx}(\tau)}{d\tau^2} = \frac{1}{2\pi} \frac{d^2}{d\tau^2} \int_{-\omega_k}^{\omega_k} S(\omega) e^{i\omega\tau} d\tau \quad (15)$$
$$= -\frac{\omega^2}{2\pi} \int_{-\omega_k}^{\omega_k} S(\omega) e^{-i\omega\tau} d\tau$$

Then the latter part of I in equation (12) can be written:

$$\int_{-\omega_b}^{\omega_b} \omega^2 S(\omega) d\omega = -2\pi \frac{d^2 R_{xx}(\tau)}{d\tau^2} = -2\pi R''_{xx}(0) \quad (16)$$

where: we have denoted $$\frac{d^2 R_{xx}(\tau)}{d\tau^2} \bigg|_{t=0} = R''_{xx}(0).$$

Thus I becomes:

$$I = 2\pi \omega_0^2 R_{xx}(0) + 2\pi R''_{xx}(0) \quad (17)$$

Also, the denominator of equation (11) is written as:

$$I_0 = \int_{-\omega_b}^{\omega_b} S(\omega) d\omega = 2\pi R_{xx}(0) \quad (18)$$

By combining equations 11, 17 and 18 we have:

$$i = \frac{I}{I_0} = \frac{I}{R_{xx}(0)} = 2\pi \omega_0^2 + \frac{R''_{xx}(0)}{R_{xx}(0)} \quad (19)$$

The evaluation of the power spectrum distribution is thus reduced to the evaluation of the autocorrelation function. The above equations were carried out for continuous time signal. Now approximating equation (19) with discrete time signals the auto-correlation function can be written as:

$$R_{xx}(\tau) = \sum_n x(n) x(n+\tau) \quad (20)$$

Next, approximate the differential $R_{xx}''(0)$ by difference as:

$$R''_{xx}(\tau) = \{R_{xx}(\tau+1) - R_{xx}(\tau)\} - \{R_{xx}(\tau) - R_{xx}(\tau-1)\} \quad (21)$$

This gives:

$$R''_{xx}(0) = \{R_{xx}(1) - R_{xx}(0)\} - \{R_{xx}(0) - R_{xx}(-1)\} \quad (22)$$
$$= 2\{R_{xx}(1) - R_{xx}(0)\}$$

Then i is approximately:

$$i = 2\pi\omega_0^2 + 2\left\{\frac{R_{xx}(1)}{R_{xx}(0)} - 1\right\} = 2\pi(\rho - A) \quad (23)$$

where: ρ is the auto-correlation coefficient, $$\rho = \frac{R_{xx}(1)}{R_{xx}(0)};$$

and A is an arbitrary parameter, A=1−πω₀². Thus evaluation of spectrum distribution is reduced to computation of auto-correlation coefficient ρ. If ρ is small (negative), the spectrum distribution is in high frequency region. If ρ is large {positive), the spectrum distributes in low frequency region.

Figure 7A:
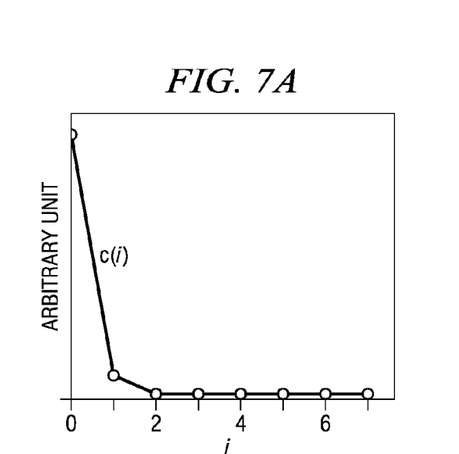
FIGS. 7A, 7B and 7C illustrate the character of signal patterns for various frequency distributions.
Figure 7B:
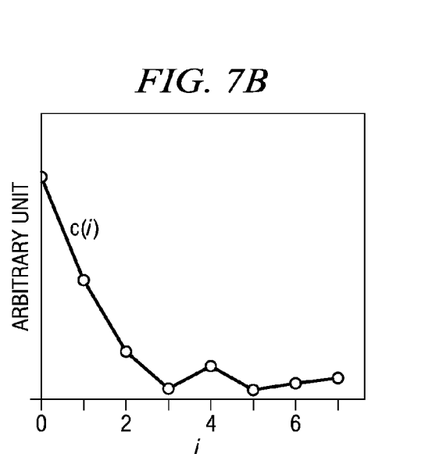
Figure 7C:
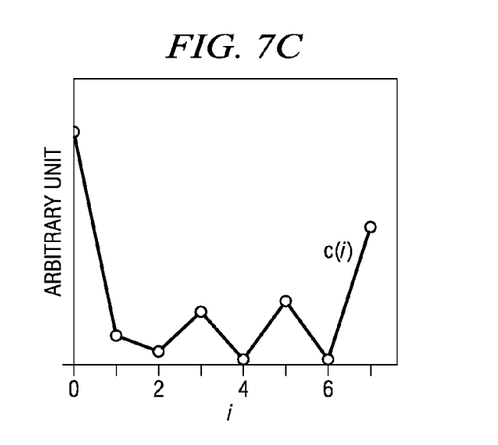

FIGS. 7A, 7B and 7C illustrate examples of signals with various frequency distribution patterns. FIG. 7A illustrates a pattern with large low frequency components and small high frequency components. This results in positive ρ as illustrates in FIG. 8A. FIG. 7C illustrates a pattern with negative ρ. The pattern illustrated in FIG. 7B might be mistaken for the pattern of FIG. 7B, since both have positive ρ. In order to distinguish pattern of FIG. 7A from that of FIG. 7B, ρ is modified as below.

$$\rho = \frac{R_{xx}(1)}{R_{xx}(0) + \delta} \quad (24)$$

Here, δ is an arbitrary number smaller than the average $R_{xx}(0)$. If $R_{xx}(0) \gg \delta$ then ρ is same as the original. If the signal is close to the pattern illustrates FIG. 7A, then its auto-correlation function will be close to zero after removal of DC component. Then, ρ will also be near zero. This modified metric value enables one to distinguish between the pattern illustrated in FIG. 7B and the pattern illustrated in FIG. 7A without changing other characteristics. Therefore, we use modified ρ in the entire derivation.

In case the area of the interest is small, equation 25 may be expressed as:

$$\rho = \frac{R_{xx}(1) * N}{R_{xx}(0) * (N-1) + \delta} \quad (25)$$

where: N is the number of pixels in the area.

The difference between this derivation and the conventional edge detection technique is important. In the conventional technique, a stripe pattern is considered as a group of edges. This method distinguishes an edge from stripes if the stripe pattern is sufficiently dense.

Figure 8A:
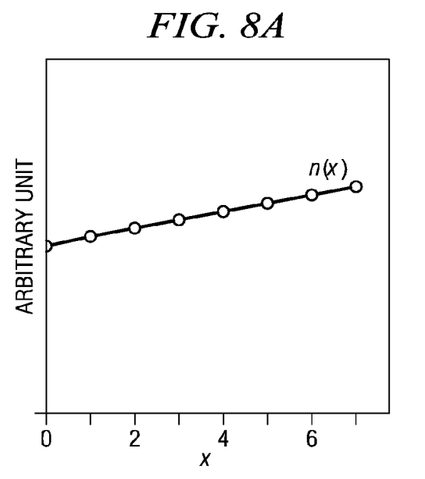
FIG. 8A illustrates the DCT coefficients mainly in the low frequency region of the signal pattern of FIG. 7A.
Figure 8B:
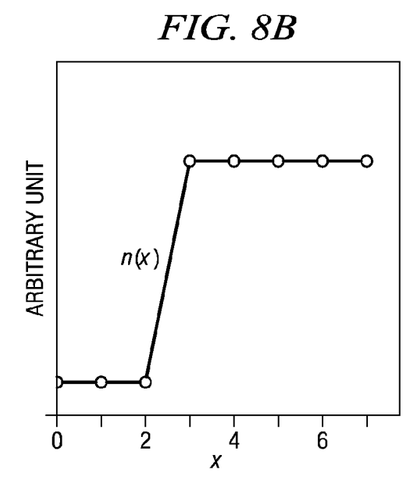
FIG. 8B illustrates DCT coefficients gradually degrading from low frequency to high frequency of the signal pattern of FIG. 7B.
Figure 8C:
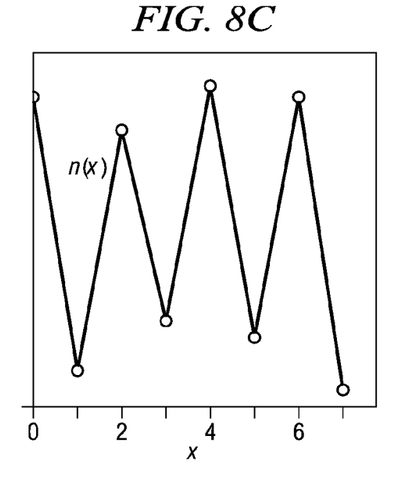
FIG. 8C illustrates the DCT coefficients large in high frequency region of the signal pattern of FIG. 7C.

FIG. 8A illustrates the DCT coefficients mainly in the low frequency region. FIG. 8B illustrates DCT coefficients gradually degrading from low frequency to high frequency. FIG. 8C illustrates the DCT coefficients large in high frequency region.

What is claimed is:

1. A method of post-processing data for noise reduction in a video image decoder comprising the steps of:
   determining noise intensity in the region of each pixel of an image including separately determining ringing intensity and block noise intensity;
   said step of determining ringing intensity includes
      calculating a short range power spectrum $\rho_S$ and a long range power spectrum $\rho_L$ employing a modified auto-correlation coefficient of power spectrum ρ; and
      determining a spectrum as ringing if said short range power spectrum $\rho_S$ is negative and said long range long range power spectrum $\rho_L$ is positive; and
   filtering each pixel of the image corresponding to the determined noise intensity.

2. The method of claim 1, wherein:
   said short range power spectrum $\rho_S$ is calculated employing nearest 5 pixels on the same line as each pixel; and
   said long range long range power spectrum $\rho_L$ is calculated employing nearest 15 pixels on the same line as each pixel.

3. The method of claim 1, wherein:
   said step of determining ringing intensity calculates ringing intensity $I_{ringing}$ as follows:

$$I_{ringing} = (\rho_{rth0} - \rho_S) \times (\rho_L - \rho_{rth1})$$

for $\rho_S < \rho_{rth0}$ and $\rho_L < \rho_{rth1}$, and $$I_{ringing} = 0$$

for all other cases,
   where: where $\rho_{rth0}$ is a first threshold constant; and $\rho_{rth1}$ is a second threshold constant.

4. The method of claim 3, wherein:
   $\rho_{rth0} = 0.2$; and
   $\rho_{rth1} = -0.5$.

5. A method of post-processing data for noise reduction in a video image decoder comprising the steps of:
   determining noise intensity in the region of each pixel of an image including separately determining ringing intensity and block noise intensity;
   said step of determining block noise intensity includes
      calculating a short range power spectrum $\rho_S$ and a long range power spectrum $\rho_L$ employing a modified auto-correlation coefficient of power spectrum ρ, and
      determining a spectrum as block noise if said short range autocorrelation coefficient $\rho_S$ is positive and said long range autocorrelation coefficient $\rho_L$ is positive; and
   filtering each pixel of the image corresponding to the determined noise intensity.

6. The method of claim 5, wherein:
   said short range power spectrum $\rho_S$ is calculated employing nearest 5 pixels on the same line as each pixel; and
   said long range long range power spectrum $\rho_L$ is calculated employing nearest 15 pixels on the same line as each pixel.

7. The method of claim 5, wherein:
   said step of determining block noise intensity calculates block noise intensity $I_{block}$ as follows:

$$I_{block} = (\rho_B - \rho_{btho}) \times (\rho_L - \rho_{bth1}) \times b(x)$$

for $\rho_B > \rho_{bth0}$ and $\rho_L < \rho_{bth1}$, and $$I_{block} = 0$$

for all other cases, where: $\rho_{bth0}$ is a first threshold constant; $\rho_{bth1}$ is a second threshold constant; and function b(x) accounts for block boundary effects.

8. The method of claim 7, wherein:

$\rho_{bth0}=-1$;

$\rho_{bth1}=-1$;

x is the distance from the nearest boundary block; and b(x)=4−|x|.

9. A method of post-processing data for noise reduction in a video image decoder comprising the steps of:

determining noise intensity in the region of each pixel of an image including separately determining ringing intensity and block noise intensity and calculating a total noise intensity $I_{total}$ as follows:

$I_{total}=c_{ringing} \times I_{ringing}+c_{block} \times I_{block}$ where: $I_{ringing}$ is the ringing intensity; $I_{block}$ is the block noise intensity; and $c_{ringing}$ and $c_{block}$ are user defined constants; and filtering each pixel of the image corresponding to the determined noise intensity.

10. The method of claim 9, wherein:

$c_{ringing}=120/256$; and $c_{block}=20/256$.

11. The method of claim 9, wherein:

said step of filtering each pixel of the image corresponding to the determined noise intensity calculates the i-th output pixel in the target line $p_i'$ as follows:

$$p_j' = \frac{\sum_{k=-2}^{2} (p_{j+k} a_k)}{\sum_{k=-2}^{2} (a_k)}$$

where: $a_k=I_{total}+(1-|k|)$; and $p_i$ is the i-th input pixel.

* * * * *